2,752,329
SOLUBLE ELASTOMERS DERIVED FROM 2,3-DICHLORO-1,3-BUTADIENE

Richard J. Reynolds, Wilmington, Del., assignor to E. I. du Pont de Nemours and Company, Wilmington, Del., a corporation of Delaware No Drawing. Application April 18, 1952,
Serial No. 283,121

5 Claims. (Cl. 260—79.5)

This invention relates to the treatment of polymers of 2,3-dichloro-1,3-butadiene to produce soluble rubber-like thermoplastic polymers and to the polymers so prepared.

When 2,3-dichloro-1,3-butadiene is polymerized, the product normally obtained is almost insoluble, and is practically non-thermoplastic. Since good solubility and plasticity are necessary for converting such elastomers into sheets, rods and similar shaped articles or into films or coatings which may be used for protecting, ornamenting, or securing adhesion, it will be apparent that a method of treating the butadiene polymer to impart these properties would be highly desirable.

It is, therefore, an object of this invention to provide a relatively simple and economical method for treating 2,3-dichloro-1,3-butadiene insoluble polymers to render them rubber-like and soluble. Another object is the provision of soluble thermoplastic elastomers which are suitable for use in adhesives, coating compositions and molding materials. A still further object is the provision of rubber-like polymers of 2,3-dichloro-1,3-butadiene which have a high tensile strength and a very low brittle point. Other objects will be apparent as the description of the invention proceeds.

These objects are accomplished by heating polymerized 2,3-dichloro-1,3-butadiene with an aliphatic mercaptan, more fully described hereinafter, in the presence of a catalyst. The product is a thermoplastic rubber-like polymeric material which contains the mercaptan in chemical combination. The polymer is sufficiently plastic to be treated like rubber in a rubber mill, and is soluble in a large variety of organic solvents.

The mercaptans which have been found satisfactory in the present invention have the sulfhydryl group attached to a carbon atom to which at least 1 hydrogen atom is also attached. Primary and secondary unsubstituted alkyl mercaptans represent preferred groups, although compounds in which the organic group contains other substituents such as 2-mercapto ethanol and mercapto acetic (thioglycolic) acid are also effective. Since these latter compounds contain functional groups in addition to sulfhydryl, they permit considerable modification of the properties of the polymer, due to the fact that the reactive groups may be converted into salts, esters, and the like. The saturated mercaptans containing from 2 to 20 carbon atoms are preferred.

The amount of mercaptan used depends upon the properties desired in the final product and upon the completeness with which the mercaptan reacts with the dichlorobutadiene polymer. Usually at least 5 mol percent of combined mercaptan (based on the mols of dichlorobutadiene originally present in the polymer) is required to impart sufficiently solubility and plasticity to the polymer to make it of practical value for the purposes mentioned above. When from 10 to 20 mol percent of combined mercaptan is present in the polymer, the viscosity of its solutions at room temperature is moderate, and it may be easily masticated on a rubber mill and calendered to form smooth, uniform sheets. More than 20 mol percent is ordinarily not necessary. In the treatment of the butadiene polymer with the mercaptan, an excess of the latter must be present over that which is intended to be combined depending on the temperature of the reaction and the catalyst used, and may run as high as 100 or even more mol percent, based on the weight of the butadiene polymer.

The catalysts used may be any of the azo catalysts such as those disclosed in U. S. Patent No. 2,471,959, although the alpha,alpha'-azo-bis(cyanoalkanes) are preferred. These azo catalysts are characterized by having an acyclic azo-N=N-group bonded to separate carbons which are aliphatic in character, i. e. aliphatic or cycloaliphatic (but not aromatic), at least one of which is tertiary (i. e. bonded to three other carbon atoms), and one of the carbon atoms bonded to the said tertiary carbon atom has its remaining valences satisfied only by an oxygen or nitrogen or combination thereof. The alpha,alpha'-azo-bis(cyanoalkanes) having the cyano group on a tertiary carbon attached to the azo group also represent a preferred class. The invention, however, is not limited to these catalysts, since a large variety are satisfactory, particularly those which yield free radicals such as benzoyl peroxide and cumene hydroperoxide. The catalyst should be present in the amount of from 1% to 10%, based on the weight of the polymer. After the reaction has been carried out to the desired extent, the residual catalyst and mercaptan can be removed if desired by extraction with an alcohol or similar solvent which does not remove appreciable amounts of the treater polymer.

In carrying out the reaction between the polymerized dichloro-butadiene and the mercaptan, it is convenient to do so in the presence of a solvent in sufficient amount to produce a fluid reaction mass. Suitable solvents for the reaction are the aromatic hydrocarbons and polychlorinated hydrocarbons.

The 2,3-dichloro-1,3-butadiene polymer may be prepared by any known method, such as emulsion or solution polymerization. When the latter is used, the polymer need not be isolated but may be treated directly with the mercaptan in the solution in which it is formed. When emulsion polymerization is used, the finely-divided polymer is isolated as, for example, by pouring the emulsion into methanol, after which it is dried and treated, while suspended in a solvent with a mercaptan according to the present invention. The polymerization of the dichlorobutadiene may be partial or complete before the reaction with the mercaptan.

The temperature of the reaction between the polymer and the mercaptan is most conveniently carried out at the boiling point of the reaction mass which should preferably be between 60° C. and 120° C.

Example I

The emulsion polymerization of 2,3-dichloro-1,3-butadiene was carried out according to the following polymerization recipe:

| | Gm. |
|---|---|
| Distilled water | 9600 |
| Potassium persulfate | 15 |
| Sodium bisulfite | 3.0 |
| Sodium hydroxide | 30 |
| Fatty alcohol sulfate sodium salt | 120 |
| Xylene | 750 |
| 2,3-dichloro-1,3-butadiene | 3000 |

The ingredients were emulsified in the usual fashion by high speed agitation at 20° C. and the resultant heat of polymerization allowed to carry the temperature to between 40 and 45° C., after which time the polymerization was allowed to proceed at 40° C. for one hour. The polymer was coagulated as a fine powder by pouring the latex into 15 gallons of well stirred methanol. After filtration the polymer was slurried in methanol, refiltered and dried for twenty hours in a vacuum oven at 50° C. The conversion, based on monomer used, was 89%. The fine white powder was totally insoluble in toluene at room temperature and, although it gave 5% solutions in hot benzene, toluene, carbon tetrachloride and other nonpolar solvents, they quickly gelled on cooling to room temperature. It was necessary to heat 0.1% xylene solutions to high temperatures in order to determine the intrinsic viscosity. The intrinsic viscosity of a 0.1% xylene solution of this polymer at 74.0° was 0.84. Attempts to cast films of this polymer from its hot solutions were unsuccessful, resulting in the deposition of a brittle, flaky, opaque residue. X-ray diffraction diagrams of these residues demonstrated a pronounced crystalline peak at the Bragg angle of $2\theta = 18.6°$. The polymer was, in fact, almost devoid of rubber-like properties and could not successfully be milled on a conventional rubber mill below 100° C. When milled, the polymer was always obtained as a highly brittle sheet which flaked off of the mill and was easily broken. The incorporation of relatively large amounts of aromatic mercaptan into the above standard recipe had an almost imperceptible effect on its physical properties.

A solution containing 24.6 gm. of the insoluble, highly crystalline polymer described above dissolved in 500 ml. of boiling benzene was treated with technical lauryl mercaptan (12.2 gm.; 0.06 mol) and alpha,alpha'-azo-bis-(isobutyronitrile) (9.9 gm.; 0.06 mol). The resulting mixture was agitated for two hours at a gentle reflux. The reaction was accompanied by the development of an orange color and the liberation of considerable hydrogen chloride. The combined reaction mixtures of eight such runs were coagulated in acetone and the resulting polymer washed thoroughly with acetone on a conventional wash mill to insure complete removal of any unreacted mercaptan. The polymer was dried at 50° C. on a rubber mill after blending with 4.0 gm. of phenyl-alpha-naphthylamine to yield 200 gm. of a tough rubber-like substance whose solubility was greater than 200 gms. per 100 gms. of toluene solution at room temperature; analysis, 2.57, 2.84% sulfur (17% lauryl mercaptan); intrinsic viscosity, 0.55 (0.2% xylene solution at 74.0° C.). Its toluene solutions were readily cast into clear tough elastic films at room temperature which gave essentially amorphous X-ray diffraction diagrams. In direct contrast to the polymer before treatment with mercaptan, this new product was a true elastomer. It readily banked and formed a smooth band on a conventional rubber mill at ordinary temperatures and was easily blended with the usual compounding ingredients such as sulfur, zinc and magnesium oxides, carbon black and the usual rubber accelerators such as 2-mercapto-benzothiazole, 2-mercaptothiazole, 2-mercaptoimidazolene and the butyraldehyde-aniline condensation product.

Example II 2,3-dichloro-1,3-butadiene monomer (100 gm. of a 77.5% solution in xylene; 0.63 mol) was combined with 400 gm. of benzene and heated to 80° C. Alpha,alpha'-azo-bis-(isobutyronitrile) (1.0 gm.; $6.1 \times 10^{-3}$ mol) was added and the mixture agitated for two hours at 80° C. An additional 1.0 gm. of alpha,alpha'-azo-bis-(isobutyronitrile) catalyst was then added and the polymerization continued for one hour at 80° C. On cooling to room temperature and standing overnight, the polymerization mixture gelled, but the polymer was redissolved by heating the mixture to gentle reflux (82° C.). Technical lauryl mercaptan (48.6 gm.; 0.24 mol) was then added, followed by alpha,alpha'-azo-bis-(isobutyronitrile) (5.0 gm.; 0.03 mol). The resulting mixture was agitated for eight hours at gentle reflux (82° C.) and allowed to cool to room temperature and stand overnight. The reaction was accompanied by the development of a dark color and the liberation of considerable hydrogen chloride.

The resulting polymer solution was coagulated by the addition of two liters of acetone and filtered. After redissolving in warm benzene, recoagulating in acetone (to insure complete removal of any unreacted mercaptan) and refiltering, the polymer was dried on a conventional rubber mill at 80° C. to give 83.6 gm. of a tough rubbery substance which was very similar to the polymer described in Example I; analysis, 3.67, 3.68% sulfur (23.2% lauryl mercaptan); solubility, greater than 20 gm. per 100 gm. of toluene solution at room temperature. Solutions of this polymer in typical non-polar solvents such as xylene were readily cast into clear tough elastic films at room temperature.

Example III

It was found that organic bases such as pyridine increased the effectiveness of mercaptan addition to polymers of 2,3-dichloro-1,3-butadiene as is shown below.

A benzene solution of 2,3-dichloro-1,3-butadiene polymer prepared as described in the Example II was treated at 82° C. with technical lauryl mercaptan (48.6 gm.; 0.24 mol) and alpha,alpha'-azo-bis-(isobutyronitrile) (5.0 gm.; 0.03 mol) as previously described, except that 5.0 ml. of pyridine was added in portions during the first forty minutes of the reaction after which time the evolution of hydrogen chloride was again noted. Agitation of the resulting dark reaction mixture was continued for a total time of eight hours at 82° C. The polymer was coagulated and purified as described in the preceding example; yield, 80.0 gm.; analysis, 4.46, 4.45% sulfur (28.1% lauryl mercaptan); solubility, greater than 20 gm. per 100 gm. of toluene solution at room temperature. The resulting polymer was similar to those previously described in Examples I and II, but was somewhat softer.

The examples in the following table show the use of other mercaptans, other catalysts, other conditions and other proportions of reactants.

| Ex. No. | Polymer, Mols | Mercaptan, Mols | | Catalyst, Mols | | Time, Hrs. | Combined Mercaptan | Solubility |
|---|---|---|---|---|---|---|---|---|
| 4 | 0.63 | lauryl | 0.24 | YY | 0.031 | 8 | 15.5 | 20 plus |
| 5 | 0.63 | do | 0.12 | YY | 0.031 | 8 | 9.9 | 20 plus |
| 6 | 0.58 | do | 0.12 | YY | 0.031 | 4 | 8.7 | 19.1 |
| 7 | 3 0.58 | do | 0.12 | YY | 0.031 | 8 | 9.4 | 20 plus |
| 8 | 0.58 | do | 0.12 | YY | 0.012 | 8 | 5.9 | 12.8 |
| 9 | 0.58 | do | 0.06 | YY | 0.031 | 8 | 6.3 | 10.0 |
| 10 | 0.58 | do | 0.12 | ZZ | 0.034 | 1 8 | 5.8 | 7.6 |
| 11 | 0.64 | do | 0.12 | XX | 0.03 | 1 5 | 12.9 | 20 plus |
| 12 | 4 0.64 | do | 0.12 | CHP | 0.031 | 2 8 | 5.0 | 3.9 |
| 13 | 0.63 | n-butyl | 0.24 | YY | 0.031 | 4.5 | 10.6 | 16.1 |
| 14 | 0.63 | n-hexadecyl | 0.12 | YY | 0.031 | 8 | 7.6 | 15.6 |
| 15 | 0.63 | 2-mercapto-ethanol | 0.12 | YY | 0.031 | 8 | 7.9 | 7.5 |
| 16 | 0.63 | thioglycolic acid | 0.12 | YY | 0.031 | 8 | 9.1 | 5 12.0 |
| 17 | 0.63 | secondary butyl | 0.24 | YY | 0.031 | 7.5 | 9.7 | 17.5 |

In the above table:
XX is 1,1'-azo-bis(cyclohexane carbonitrile).
YY is alpha, alpha'-azo-bis(isobutyronitrile).
ZZ is alpha, alpha'-azo-bis(alpha, gamma-dimethylvaleronitrile).
CHP is cumene hydroperoxide.
1 Temperature 60°.
2 Temperature 110°, toluene as solvent.
3 Degree of conversion 71%.
4 Degree of conversion 76%.
5 Solubility in tetrahydrofuran.

In each case, unless otherwise noted, the polymer to be treated was made substantially as described in Example II above, using as catalyst for the polymerization the same kind of catalyst as was later used in the addition of the mercaptan. The degree of conversion of monomer to polymer was greater than 90% except as noted. The amount of polymer, corresponding to the number of mols of dichlorobutadiene shown, was heated in 455 ml. of benzene with the indicated mercaptan and catalyst for the time indicated at 82°. In some cases, as shown in the foot notes, other temperatures and solvents were used. The product was then worked up as described in Example II. The mercaptan content in mol percent was calculated from the sulfur content determined by analysis. The solubility was determined by heating 20 grams of product in 100 grams of toluene, cooling to room temperature, separating the solid phase, and determining the solids dissolved in the liquid phase. The results are reported in grams dissolved, per 100 grams of toluene. 20+ means that 20 grams was completely soluble at room temperature. The products were all completely soluble in this amount of solvent at higher temperatures.

While the invention has been illustrated by secondary butyl mercaptan as a suitable secondary aliphatic mercaptan, it is to be understood that other such secondary mercaptans may be used in place of the primary mercaptans in equivalent amount.

Other mercaptans not primary or secondary and aliphatic, such as tertiary octyl mercaptan, thiophenol, xylyl mercaptan, and mercaptobenzothiazol, used in the process of the above examples, gave almost insoluble products containing 2 mol percent or less of combined mercaptan. A similar product resulted when lauryl mercaptan was used without any catalyst.

The lauryl mercaptan used in the above examples was a technical grade, made from a lauryl alcohol obtained by reduction of cocoanut oil with hydrogen.

The products of this invention, in the form of solutions in aromatic hydrocarbons or chlorinated solvents such as carbon tetrachloride, are particularly useful in forming adhesive bonds between metals and elastomers and in coating leather. In the latter connection, they have the advantages of being flexible and closely adhering, of having low plating tack, and no rubbery feel. The solvent-free products may be shaped to any desired form in molds or presses, and may be extruded in the form of rods or ribbons or sheeted on a rubber mill. Such sheets are transparent and pliable, and in one typical case, had a tensile strength of 710 lbs. per square inch and a brittle point of −35°. Sheets may also be cast from solution. The material may be compounded like rubber with pigments, fillers, stabilizers, reinforcing agents, etc.

These uses are based on results obtained by the present invention which are entirely unexpected to those familiar with the chlorobutadiene polymer art. While it is known that these polymers may be plasticized by milling in the presence of aromatic mercaptans, it is also well known that aliphatic mercaptans are ineffective to produce polymers suitable for the above uses. This is particularly so since copolymers of 1,3-butadiene and styrene, when treated with n-dodecyl mercaptan yield a syrupy product. In the present invention the change from the brittle hard dichlorobutadiene polymer used in the present to the soft plastic product is of an entirely different kind from that which rubber of butadienestyrene copolymers undergo in the presence of mercaptans. In the case of natural rubber and the butadiene copolymers, the only change imparted by the mercaptan is one of degree, that is, the further plasticizing of the already plastic material. The present invention, therefore, represents a very distinct advance in the art.

It will be apparent that many widely different embodiments of this invention may be made without departing from the spirit and scope thereof, and therefore it is not intended to be limited except as indicated in the appended claims.

I claim:

1. The process of solubilizing 2,3-dichloro-1,3-butadiene polymers which comprises reacting said polymer at a temperature within the range of 60° C. to 120° C. with from 5–100 mol percent, based on the weight of the polymer, of an aliphatic mercaptan of from 2–20 carbon atoms, said mercaptan having its sulfhydryl group attached to a carbon atom bearing at least one hydrogen atom, in the presence of a catalyst present in the amount of from 1–10%, based on the weight of the polymer.

2. The process of claim 1 in which the catalyst is an azo catalyst.

3. The process of claim 1 in which the catalyst is one which yields free radicals.

4. The process of claim 1 in which the reaction is carried out in the presence of a solvent for the polymer.

5. A soluble thermoplastic elastomer comprising the reaction product of a polymer of 2,3-dichloro-1,3-butadiene and from 5 to 100 mol percent, based on the weight of the polymer, of an aliphatic mercaptan of from 2–20 carbon atoms, said reaction having been conducted at a temperature within the range of 60° C. to 120° C., said mercaptan having its sulfhydryl group attached to a carbon atom bearing at least one hydrogen atom, in the presence of a catalyst present in the amount of from 1–10%, based on the weight of the polymer.

References Cited in the file of this patent

UNITED STATES PATENTS

| | | |
|---|---|---|
| 2,227,517 | Starkweather | Jan. 7, 1941 |
| 2,365,035 | Youker | Dec. 12, 1944 |
| 2,385,182 | Anderson et al. | Sept. 18, 1945 |
| 2,471,959 | Hunt | May 31, 1949 |
| 2,514,195 | Kuhn | July 4, 1950 |